(12) United States Patent
Reid et al.

(10) Patent No.: US 6,703,337 B2
(45) Date of Patent: Mar. 9, 2004

(54) CERAMIC MEDIA

(75) Inventors: John S. Reid, Wooster, OH (US); Thomas Szymanski, Hudson, OH (US); Anne Hardy, Acton, MA (US); James Salvatore, Worcester, MA (US); Michael J. Mangaudis, Worcester, MA (US)

(73) Assignee: Saint-Gobain Corporation, Stow, OH (US)

( * ) Notice: Subject to any disclaimer, the term of this patent is extended or adjusted under 35 U.S.C. 154(b) by 0 days.

(21) Appl. No.: 10/146,644

(22) Filed: May 15, 2002

(65) Prior Publication Data

US 2003/0008763 A1 Jan. 9, 2003

Related U.S. Application Data

(63) Continuation-in-part of application No. 09/859,551, filed on May 17, 2001, now abandoned.

(51) Int. Cl.$^7$ .................... C04B 33/00; C04B 33/24; C04B 35/19
(52) U.S. Cl. ............... 501/141; 501/143; 501/144; 264/319; 264/679
(58) Field of Search ............... 501/141, 143, 501/144; 264/679, 319

(56) References Cited

U.S. PATENT DOCUMENTS

| | | | | |
|---|---|---|---|---|
| 3,228,779 A | | 1/1966 | Van Der Beck, Jr. | |
| 3,650,817 A | * | 3/1972 | Motoyuki | 501/143 |
| 3,818,087 A | * | 6/1974 | Smyser | 501/143 |
| 3,979,216 A | | 9/1976 | Fritsch, Jr. et al. | |
| 4,098,725 A | | 7/1978 | Yamamoto et al. | |
| 4,101,330 A | * | 7/1978 | Burk et al. | 501/143 |
| 4,301,214 A | * | 11/1981 | Crandall | 501/143 |
| 4,632,876 A | | 12/1986 | Laird et al. | |
| 4,880,759 A | * | 11/1989 | Kohut | 501/143 |
| 5,275,989 A | * | 1/1994 | Salge et al. | 501/143 |
| 5,731,250 A | | 3/1998 | Reid et al. | |
| 5,773,103 A | | 6/1998 | Ciora, Jr. et al. | |
| 5,914,294 A | * | 6/1999 | Park et al. | 501/143 |
| 6,066,585 A | | 5/2000 | Swartz | |
| 6,207,612 B1 | | 3/2001 | Reid et al. | |

FOREIGN PATENT DOCUMENTS

| | | |
|---|---|---|
| CN | 1 049 839 | 3/1991 |
| GB | 865872 | 4/1961 |
| GB | 1023471 | 3/1966 |
| JP | 56 109869 | 8/1981 |
| JP | 1115848 | 5/1989 |

OTHER PUBLICATIONS

Kusnik, et al., "Physical Properties of Spodumene–Kaolin Mixtures in the Firing Range 1270–1300 Degree", *Materials Science Forum* (1988), 34–36 (Int. Ceram. Conf., Austceram 88, Pt. 2), 931–5., (no month).
PCT Search Report (PCT/US02/13684) Aug. 2002.

* cited by examiner

*Primary Examiner*—Michael Marcheschi
(74) *Attorney, Agent, or Firm*—Thomas G. Field, III

(57) ABSTRACT

Ceramic media made using ceramic components comprising from 5 to 60% by weight of spodumene and 95 to 40 wt % of other ceramic-forming components comprising clay and feldspar have a reduced tendency to shrink upon firing to form the media and improved physical properties.

17 Claims, No Drawings

CERAMIC MEDIA

CROSS REFERENCE TO RELATED APPLICATION

This application is a CIP of Ser. No. 09/859,551 filed May 17, 2001, now abandoned.

BACKGROUND OF THE INVENTION

The present invention relates to the production of ceramic media, and particular media useful in mass transfer applications in which the media are subjected to repeated thermal cycling. An important example of the fields in which the improved media are useful is in conjunction with thermal regenerative oxidizers (RTOs). Conventional media subjected to thermal cycling undergo volume dimensional changes during thermal cycling and this can lead to weakness and eventually loss of physical integrity, particularly if subjected to abrasive forces, or static forces from the load of media in a thermal oxidizer or other industrial process column. Media with reduced susceptibility to dimensional changes during thermal cycling would therefore have a significant advantage.

A further problem with conventional ceramic media is that they inherently suffer large volumetric changes during firing. Such media are conventionally made by blending suitable ceramic-forming raw materials such as clay, feldspar, talc, wollastonite, zircon sand and other minerals. This mixture is then formed into a shapeable mixture and formed into so-called "greenware" which has the shape of the desired ceramic media but not the physical properties and is converted into the media by firing the greenware at an elevated temperature. During the firing, the components interact through a combination of solid state, liquid phase, and vapor phase sintering mechanisms to form the desired ceramic material. The problem is that, when the shaped greenware is fired, a volume change usually occurs that can easily be from 25 to 35%. Firing occurs in a kiln which is of limited volume. Thus it can only produce a volume of ceramic product that is ¾ to ⅔ of the volume of greenware loaded. This makes the process very inefficient.

A formulation and a firing process have now been developed that result in a ceramic with little volume change or deterioration of physical properties as result of thermal cycling and little or no productivity loss as a result of loss of product volume during firing.

DESCRIPTION OF THE INVENTION

The present invention provides ceramic media obtained by firing greenware shaped from a mixture comprising 5 to 60 wt. % and preferably from 5 to 20 wt % of spodumene, and from 95 to 40, and preferably from 95 to 80 wt. % of other ceramic-forming components comprising from 50 to 95 wt. % of clay and from 5 to 50 wt. % of feldspar based on the combined weights of these components, said media having a linear shrinkage of less than 5%, and preferably less than 2.5%, by comparison with the dimensions of the pre-fired greenware The invention further comprises a process for the production of ceramic media which comprises:

a) forming a mixture comprising from 5 to 60, and preferably from 5 to 20, wt % of spodumene and from 95 to 40, and preferably from 95 to 80 wt. % of other ceramic-forming components comprising from 50 to 95 wt. % of clay and from 5 to 50 wt. % of feldspar based on the combined weights of these components all weights being based on the total weight of ceramic-forming components, into greenware having a desired shape; and b) firing the greenware to produce ceramic media; wherein the ceramic-forming components are chosen such that, upon firing, the linear dimensions of the greenware are not reduced by more than 5% and more preferably by not more than 2%.

Particularly preferred mixtures comprise 5 to 20 and more preferably 10 to 15 wt. % of spodumene; and 95 to 80 and more preferably 90 to 85 wt % of other ceramic-forming components of which from 30 to 95 wt. % and preferably from 50 to 90 wt % is a kaolinite clay; and from 5 to 70, and preferably 10 to 50 wt. % is a feldspar, all percentages being based on the total weight of the other ceramic-forming components.

Spodumene is a naturally occurring mineral that is a mixture of the aluminosilicates of lithium and sodium and two of the common minerals are "kuntzite" and "hiddenite". The generic name is "triphane". The preferred dominant mineral is a lithium aluminosilicate and the lithium content of the mineral, measured as lithium oxide, is between about 7.15 and 7.75% by weight.

Clays are generically mixed oxides of alumina and silica and include materials such as kaolin, ball clay, fire clay, china clay and the like. Preferred clays are high plasticity clays such as ball clay and fire clay. Particularly preferred clays have a methylene blue index, ("MBI"), of about 11 to 13 meq/100 gm.

The term "feldspars" is used herein to describe silicates of alumina with soda, potash and lime.

Other components such quartz, zircon sand, feldspathic clay, montmorillonite, nepheline syenite and the like can also be present in minor amounts of the other ceramic-forming components in the formulations according to the invention providing the resultant formulation meets the dimensional change requirements set forth above.

The components fired together to produce the ceramic products of the invention are preferably supplied in fine powder form and are made into a shapeable mixture by the addition of water and or extrusion aids. Shaping can be by molding but economics usually dictate that the shapes are made by an initial extrusion process followed by cutting perpendicular to the direction of extrusion into the desired lengths.

The fired ceramic media have an apparent open porosity, as measured by ASTM C-373, that is less than 8% by volume and preferably less than 4% by volume. The amount of absorbed water is less than 4% by weight and more preferably less than 2% by weight, as measured according to the method described in ASTM-C-373.

The process by which the ceramic media can be made includes mixing the components with a mixing medium such as water and shaping the mixture into the desired shape such as by extrusion or molding to form greenware, and then drying the greenware at a temperature sufficient to drive off associated water over a period that is preferably several hours. This is to avoid disrupting the weak structure of the greenware and is usually carried out at below about 120° C. and frequently below about 70° C. and lasts for about 5 hours. The dried greenware is then fired at an elevated temperature, such as from 1100 to 1300° C., which is reached gradually over a period of from about 3 to about 20 hours and is usually maintained for from 1 to 5 hours before allowing a gradual cooling to ambient temperatures.

The ceramic media of the invention can have the form of monoliths with multiple through passages but more appropriately the media are in the form of random or dumped packings with shapes such as rings, cylinders, spheres, pellets and the like. Media in such shapes are placed in a heat exchange unit in random fashion with as many incorporated as the space can accommodate.

The ceramic media according to the invention have an added unexpected advantage in that they typically lose less than 10% of crush strength and preferably less than 5% after having been subjected to a temperature cycle of 800° C. Indeed they often seem to increase their crush strength.

DESCRIPTION OF PREFERRED EMBODIMENTS

The invention is now described with specific reference to the following Examples, which are intended to illustrate but not delimit aspects of the invention.

The materials used in the Examples were as follows:

| Clays: | |
|---|---|
| Ball Clay | supplied by the Unimin Co., or the K. T. Clay Co. as a "high plasticity" clay. In either case it has a methylene blue index (MBI) of approximately 11–13 meq/100 gm. The clay is in the form of a powder with a particle size such that greater than 90% by weight is finer than 10 microns |
| Fire Clay | supplied by Cedar Heights Clay Co. It has an MBI of approximately 7 to 8 meq/100 gm. and particle sizes ranging from 0.5 microns to 20 microns, with an average particle size of about 3 to 4 microns. |
| Spodumene: | |
| | Spodumene concentrate supplied by Gwalia Co. or the Tantalum Mining Co. in the form of a powder with particles sizes ranging from about 20 to 200 microns, with an average particle size of about 85 to 95 microns, and a lithium content, measured as lithium oxide, of 7.15 to 7.75% by weight. |
| Other Minerals: | |
| Feldspar | a) 30 mesh processed grade with a particle size of at least 10% coarser than 40 mesh and at least 70% coarser than 100 mesh. The total content of sodium and potassium, measured as their oxides, is at least 10% by weight.<br>b) 200-mesh sodium feldspar with a sodium oxide content of 6.5% by weight and a potassium oxide content of about 4.1% by weight.<br>c) feldspathic conglomerate.<br>d) nepheline syenite |

EXAMPLE 1

In this Example the relatively low shrinkage obtained using ceramic formulations according to the invention to prepare packing media elements is compared with similar elements prepared using conventional ceramic formulations.

A formulation batch comprising 3814 gm of ball clay (60% by weight), and 2542 gm of spodumene (40% by weight) was made and mixed using a high intensity mixer for two minutes. Water (1300 gm or 20.45% of the dry weight of the formulation) was added along with 64 gm of polyethylene glycol and mixing was continued for a further two minutes to produce an extrudable mixture. This was then fed into a single piston laboratory extruder fitted for vacuum de-airing, and extruded through a die to produce an extrudate with a contoured shape and through-holes and a maximum dimension of about 53.3 mm. The extrudate was then cut into pieces to produce the ceramic greenware shapes ready for firing.

The greenware shapes were dried at 110° C for a little over four hours and then were placed in saggers and fired in an electrically powered kiln at a heat-up rate of 3° C./min. until a maximum temperature of 1225° C. was reached. The temperature was held at the level for an hour before being allowed to cool to room temperature at a rate comparable to the heat-up rate. The fired shapes were then measured along their greatest dimension taking caliper measurements at at least five locations on at least five samples and averaging the readings. This average was then compared with the accurate measurement of the corresponding dimension of the die through which they were extruded. The die dimension was 53.264 mm. The average dimension of the samples was 53.111 mm., representing a linear shrinkage of only 0.33%.

To produce a basis for comparison, a series of three conventional formulations was produced in which the spodumene component was replaced on a gram for gram basis by a) a fine sodium feldspar; b) a feldspathic conglomerate; and c) nepheline syenite. These three batches were mixed, formed into shapes, dried and fired in exactly the same way as the formulation of the invention and the average longest dimensions were 45.961 mm; 47.457 mm; and 44.160 mm. This amounts to linear shrinkage values of 13.78%, 10.97% and 15.73% respectively.

EXAMPLE 2

In this Example samples having a disc shape and minimum porosity are evaluated in terms of percentage linear dimension change at two different firing temperatures.

A formulation batch consisting of 240 gm. of fireclay (80% by weight) and 60 gm (20% by weight) of spodumene was mixed in a high-intensity mixer for two minutes and then 9 gm of water (3% of the dry weight of the batch) were added and mixing was continued for a further two minutes. This yielded a free-flowing powder which pressed into discs 25.4 mm in diameter using a hydraulic hand press at a pressure of about 12,000 psi., ($82.7 \times 10^6$ newtons/m$^2$). The discs were dried at 100° C. for at least four hours before being fired in the same kiln and under the same conditions as were used in Example 1. The average diameter of six discs produced in this fashion was determined and this showed that the discs had actually expanded in diameter by an average of 0.88%.

A further set of six discs was prepared from the same batch in exactly the same manner except that the maximum temperature reached in the kiln was 1150° C. instead of 1225° C. These showed an average linear expansion of 1.95%.

EXAMPLE 3

In this Example samples are prepared with the addition of a feldspar component and, in addition to evaluating the effect on dimensional change the porosity of the samples made was examined. The measurements were carried at two different firing temperatures.

A formulation was prepared comprising 8.17 kg (36 wt %) of ball clay, 9.08 kg (40 wt %) of spodumene and 5.45 kg (24 wt %)of feldspar. The formulation was mixed in a high-intensity mixer for two minutes and then 3.52 kg (15.5% of the dry formulation weight) of water were added and the mixing was continued for another two minutes. This resulted in an extrudable batch which was fed into the extruder used in Example 1 except that it was fitted with a 12.7 mm square die. The extrudate was cut at 15.24 cm intervals to produce a series of greenware bars which were then dried at 65.6° C. for four hours after which the average cross-section, (width), dimension was determined and found to 12.52 mm.

A portion of the dried greenware bars was fired to a maximum temperature of 1210° C. and another portion was fired to a maximum temperature of 1250° C. In each case the firing conditions and equipment described in Example 1 were used, differing only in the maximum temperature. After firing the average width dimension for the bars fired at 1210° C. was 12.42 mm and for the bars fired at the higher temperature the corresponding measurement was 12.60 mm. Thus the percentage change for the bars fired at the lower temperature was 0.811% (shrinkage) and for the bars made at the higher firing temperature an expansion of 0.61% occurred.

These samples were then measured for open porosity using the method described in ASTM C-373 water absorption method. The values obtained were 4.3% and 6.6% for the bars fired at the lower and higher temperatures respectively. A typical ceramic element made from the same ball clay and feldspar mixture but without the spodumene, and having the same porosity, is known to have a linear shrinkage of approximately 4 to 8%. This indicates that the ceramic elements according to the invention retain low dimensional change upon firing even when containing the similar range of porosity present in prior art products.

EXAMPLE 4

This Example evaluates the thermal shock resistance of the ceramic formulations characterizing the present invention and other physical parameters.

A batch having the same composition as that used in Example 3 was made up using the same procedure and extruded, dried and fired in the same way except that the extrusion die had a cylindrical cross-section with a diameter of 85 mm with a plurality of triangular cross-section through holes, and the firing temperature was 1210° C. and the cooling was allowed to occur over 20 hours. The fired pieces so obtained were then subjected to X-Ray diffraction analysis and tests measuring porosity, density and crush strength.

The material density and apparent porosity, (measured according to ASTM C-373 methods), were 2.15 gm/cc and 7.0% respectively. The X-Ray diffraction analysis revealed the only major peak to correspond to beta-spodumene which is the "expanded" form of lithium aluminum silicate. The crush strength was measured on individual pieces in a horizontal orientation supported on four equally spaced contiguous alumina spheres with a diameter of 12.7 mm. with a load being placed on a fifth similar sphere centered on top of the piece under evaluation. The load was increased gradually until failure occurred at which point the load reading dropped suddenly. The average crush strength measured was 75.36 kg. from a sample size of 10 and the standard deviation within the group of measurements was 15.89 kg.

Ten sample pieces were placed in a furnace and heated to 816° C. and held at that temperature for an hour. The pieces were then quickly removed and dropped into room temperature water; an essentially instantaneous drop in temperature of about 800° C. The pieces did not break or crack. After they had been dried they were tested for crush strength in the same way set forth above. This time the average crush strength was 87.62 kg with a standard deviation of 15.89 kg again. While it may be unsafe to conclude statistically that there was an increase in strength as a result of the thermal cycling, it is certainly clear that there was no reduction in crush strength.

EXAMPLE 5

This Example essentially repeats Example 4 under slightly different conditions to confirm the validity of the conclusions.

The ceramic components mixed in the same proportions were used to make an extrudable formulation with the sole difference that the water added was 14.2% of the dry weight of the formulation in place of 15.65%. The mixture was extruded using the same extruder except that the extrusion die had a shape corresponding to a ring with multiple triangular shaped through-holes, and produced a shape with a diameter of approximately 68 mm. The extruded shape was cut perpendicular to the direction of extrusion to produce a plurality of ceramic greenware pieces which were dried under the same conditions describe in Example 4. The outer diameter of the dried greenware pieces was determined by recording maximum and minimum values of the diameter and deriving an average value for each and averaging this result over five randomly selected pieces. The average value obtained was 65.52 mm.

The greenware was placed in saggers and fired in a kiln with the temperature raised by 70° C./hr until a maximum temperature of 1210° C. had been reached. The temperature was held at that level for three hours before being allowed to cool to room temperature over a 20 hour period. The diameter of the fired samples was measured in the same way as the greenware diameter was measured. The fired average diameter was 65.44 mm showing an average linear shrinkage of 0.12% and a calculated volume shrinkage of 0.35%.

In a repeat of this experiment a different group of the same greenware samples was fired in the same equipment but at a heat-up rate of 73° C./hr and a dwell time temperature of 1230° C. These samples were then subjected to the same measurements and showed an average diameter of 65.01 mm. This corresponds to a linear shrinkage of 0.78% and a calculated volumetric shrinkage of 2.3%.

These fired samples were tested for crush strength and thermal shock resistance in the general manner described in Example 4. The average strength of the fired pieces was 61.29 kg. and, after having been held at 427° C. for an hour and then dumped into room temperature water, the crush strength was 82.63 kg. These figures seem to confirm the lessons learned from the previous Example.

EXAMPLE 6

Three batches of ceramic powders were prepared as mixtures of a 30 mesh fireclay, a 20 mesh feldspar, and the spodumene powder. The first batch, further referred to in this example as "standard", was comprised of 408 gm of the fireclay (60 wt %) and 272 gm of the feldspar (40 wt %). The second batch, further referred to as 11.8% spodumene, was comprised of 408 gm of the fireclay (60 wt %), 192 gm of the feldspar (28.2 wt %) and 80 gm of spodumene (11.8 wt %). The third batch, further referred to as 17.6% spodumene, was comprised of 408 gm of the fireclay (60 wt %), 152 gm of the feldspar (22.4 wt %) and 120 gm of spodumene (17.6 wt %).

The components for each batch were mixed together in a high intensity mixer for 1 minute. Then 120 gm of deionized water was added (17.65 wt % of the dry basis) and mixing continued until the materials formed a uniform consistency. Each batch mixture was then fed into a lab scale single auger-style extruder and extruded through a rectangular die, having cross sectional dimensions of 16.5 mm and 13.5 mm. The extruded greenware from each batch were then sectioned perpendicular to the extrusion direction into 25 mm lengths. The greenware parts were fully dried and the longer of the two uncut dimensions (width) was measured for each. The parts were then fired at 3° C./min to a maximum temperature of 1170° C., and soaked at 1170° C. for 2 hours.

After firing, the width dimension of the parts was again measured and the linear shrinkage was calculated. The percent linear shrinkage values for the standard, 11.8% spodumene, and 17.6% spodumene were 2.35, 2.71 and 2.44 respectively. These samples were then measured for percent water absorption (ASTM standard C-373). The percent water absorption values for the standard, 11.8% spodumene, and 17.6% spodumene were 6.03, 2.37, and 1.63 respectively. This shows that for relatively the same linear shrinkage, the addition of spodumene can decrease the percent water absorption.

Several fired samples were thermally shocked by heating to 700° C. and fast quenching into 19 liters of room temperature water. The strength was measured on the thermally shocked samples as compared to un-shocked samples of each test composition. The cut ends (perpendicular to the extrusion direction) of the 25 mm parts were machined flat and parallel. The crush strengths of individual pieces were then measured in the extrusion direction, attached to a silicon nitride spherical seat using a 10,000 kg limit Instron load measurement device in which the sample was placed between parallel steel plates and the plates were urged together at a rate of 25 mm/min. Failure occurred when the load reading in the Instron device suddenly fell and the maximum reading was the crush strength. The average crush strength of the standard, 11.8% spodumene, and 17.6% spodumene samples that were not thermally treated were 167 MPa, 254 MPa and 272 MPa respectively. The average crush strength of the fast quenched samples for the standard, 11.8% spodumene, and 17.6% spodumene samples were 137, 215 and 256 MPa respectively. This represents a retained strength for the standard, 11.8% spodumene, and 17.6% spodumene samples of 82, 85 and 94% respectively.

EXAMPLE 7

Three batches of ceramic powder mixtures were prepared as mixtures of a 30 mesh fireclay, a 50 mesh feldspar, and the spodumene powder. The first batch, further referred to in this example as "standard", was comprised of 408 gm of the fireclay (60 wt %) and 272 grams of the feldspar (40 wt %). The second batch, further referred to as 5% spodumene, was comprised of 387.6 gm of the fireclay 30 (57 wt %), 258.4 gm of the feldspar (38 wt %) and 34 gm of spodumene (5 wt %). The third batch, further referred to as 20% spodumene, was comprised of 326.4 gm of the fireclay 30 (48 wt %), 217.6 gm of the feldspar (32 wt %) and 136 gm of spodumene (20 wt %).

The components for the standard batch were mixed together in a high intensity mixer for 1 minute. Then 120 gm of deionized water was added (17.65 wt % of the dry basis) and mixing continued until the materials formed a uniform consistency. For the 5% spodumene and 20% spodumene batches, the fireclay and feldspar were mixed together in a high intensity mixer for 1 minute. The spodumene was pre-dispersed in the water using a high shear mixer. The spodumene solution was then added to the other components in the mixer, and these were mixed in a high intensity mode until the materials formed a uniform consistency.

Each batch mixture was then fed into a lab scale single auger-style extruder and extruded through a rectangular die, having cross sectional dimensions of 16.5 mm and 13.5 mm. The extruded greenware from each batch were then sectioned perpendicular to the extrusion direction into 25 mm lengths. The greenware parts were fully dried and the longer of the two uncut dimensions (width) was measured for each. Five each of the sets of parts were then fired at 3° C./min to maximum temperatures of 1140° C., 1170° C., and 1200° C. and soaked at maximum temperature for 2 hours. After firing, the width of the parts were again measured and the linear shrinkage was calculated. The percent linear shrinkage values for the standard, 5% spodumene, and 20% spodumene at 1140° C. were 3.72, 4.35 and 3.99 respectively. The percent linear shrinkage values for the standard, 5% spodumene, and 20% spodumene at 1170° C. were 4.13, 4.01 and 2.60 respectively. The percent linear shrinkage values for the standard, 5% spodumene, and 20% spodumene at 1200° C. were 4.27, 4.18 and −3.46 (linear expansion) respectively. This shows that the 20% spodumene pre-dispersed has a decreased linear shrinkage when fired to 1170° C. and 1200° C. as compared to the standard body.

These samples were then measured for percent water absorption (ASTM standard C-373). The percent water absorption values for standard, 5% spodumene, and 20% spodumene at 1140° C. were 4.97, 3.34 and 0.12 respectively. The percent water absorption values for standard, 5% spodumene, and 20% spodumene at 1170° C. were 3.47, 0.81 and 0.03 respectively. The percent water absorption values for standard, 5% spodumene, and 20% spodumene at 1200° C. were 2.63, 0.02 and 0.23 respectively. This shows that pre-dispersed additions of spodumene at 5% and 20% reduce the level of water absorption at 1140° C., 1170° C. and 1200° C. as compared to the standard body.

This work shows that with a 5 wt % addition of pre-dispersed spodumene, a body can have a linear shrinkage between 4.0% and 4.5%. It also shows that the water absorption of said body can be adjusted with firing temperature going from 3.34% at 1140° C. through 0.81% at 1170° C. to 0.02% at 1200° C.

This work shows that with a 20 wt % addition of pre-dispersed spodumene, a body can have a water absorption of less than 0.25%. It also shows that the linear shrinkage of said body can be adjusted with firing temperature, going from 3.99% at 1140° C. through 2.60% at 1170° C. to −3.46% (linear expansion) at 1200° C.

We claim:

1. Greenware for forming ceramic media comprising 5 to 20 wt. % of spodumene, and from 95 to 80 wt. % of other ceramic-forming components comprising from 50 to 95 wt. % of clay and from 5 to 50 wt. % of feldspar based on the combined weights of these ceramic-forming components, said ceramic-forming components being chosen, such that upon firing, said greenware forms said ceramic media and wherein said ceramic media has a linear shrinkage of less than 5% by comparison with the dimensions of the pre-fired greenware.

2. Greenware according to claim 1 in which the clay component has an MBI of from 11 to 13 meq/100 gm.

3. Greenware according to claim 1 in which the spodumene contains lithium in an amount, measured as lithium oxide, of from 7.25 to 7.75% by weight.

4. A process for the production of ceramic media which comprises:
   a) forming a mixture comprising from 5 to 20 wt % of spodumene and from 95 to 80 wt. % of other ceramic-forming components comprising from 50 to 95 wt. % of clay and from 5 to 50 wt. % of feldspar based on the combined weights of these ceramic-forming components, all weights being based on the total weight of ceramic-forming components, into greenware having a desired shape; and
   b) firing the greenware to produce ceramic media;

wherein the ceramic-forming components are chosen such that, upon firing, the linear dimensions of the greenware are not reduced by more than 5%.

5. A process for producing ceramic media as in claim 4, in which the forming and firing processes are chosen such that upon firing, the linear dimensions of the greenware actually increase, resulting in a net volumetric expansion.

6. Greenware according to claim 1 in which the percent retention of crush strength of the ceramic media is at least 85% from severe thermal shock test treatments using a sudden temperature drop of from 400 to 800° C.

7. Greenware according to claim 6 which the percent retention of crush strength of the ceramic media is at least 98% from severe thermal shock test treatments using a sudden temperature drop of from 400 to 800° C.

8. Greenware according to claim 1 in which, upon firing, the linear dimensions of the greenware are not reduced by more than 2.5%.

9. Greenware according to claim 1, in which the greenware comprises 22.4 to 40 wt % feldspar, based on the combined weights of all ceramic forming ingredients.

10. A process for producing ceramic media as in claim 4, in which the percent retention of crush strength is at least 85% from severe thermal shock test treatments using a sudden temperature drop of from 400 to 800° C.

11. A process for producing ceramic media as in claim 4, in which upon firing, the linear dimensions of the greenware are not reduced by more than 2%.

12. Greenware for forming ceramic media comprising 5 to 20 wt. % of spodumene, and from 95 to 80 wt. % of other ceramic-forming components comprising from 50 to 90 wt. % of clay and from 10 to 50 wt. % of feldspar based on the combined weights of these ceramic-forming components, the ceramic forming components being chosen such that, upon firing, aid greenware forms said ceramic media, and wherein said ceramic media has a linear shrinkage of less than 2.5%, by comparison with the dimensions of the pre-fired greenware.

13. Greenware according to claim 12, in which the spodumene is present at up to 15 wt %.

14. Ceramic media comprising a fired mixture of 5 to 20 wt. % of spodumene, and from 95 to 80 wt. % of other ceramic-forming components comprising from 50 to 95 wt. % of clay and from 5 to 50 wt. % of feldspar based on the combined weights of these ceramic-forming components, which upon firing, forms said ceramic media and wherein said ceramic media has a linear shrinkage of less than 5% by comparison with the dimensions of the pre-fired greenware.

15. Ceramic media according to claim 14 which the clay component has an MBI of from 11 to 13 meq/100 gm.

16. Ceramic media according to claim 14 in which the spodumene contains lithium in an amount, measured as lithium oxide, of from 7.25 to 7.75% by weight.

17. Ceramic media according to claim 14 in said ceramic media has a linear shrinkage of less than 2.5%, by comparison with the dimensions of the pre-fired greenware.

* * * * *

UNITED STATES PATENT AND TRADEMARK OFFICE
CERTIFICATE OF CORRECTION

PATENT NO. : 6,703,337 B2
DATED : March 9, 2004
INVENTOR(S) : John S. Reid et al.

It is certified that error appears in the above-identified patent and that said Letters Patent is hereby corrected as shown below:

Title page,
Item [73], Assignee, delete "Saint-Gobain Corporation" and insert therefor -- Saint-Gobain Norpro Corporation --

Signed and Sealed this

Fourteenth Day of December, 2004

JON W. DUDAS
*Director of the United States Patent and Trademark Office*